United States Patent [19]

Ishii et al.

[11] Patent Number: 4,779,083

[45] Date of Patent: Oct. 18, 1988

[54] DISPLAY CONTROL SYSTEM

[75] Inventors: Takatoshi Ishii, Tokyo; Makoto Kaneko, Hamamatsu, both of Japan

[73] Assignees: ASCII Corporation, Tokyo; Nippon Gakki Seizo Kabushiki Kaisha, Hamamatsu, both of Japan

[21] Appl. No.: 824,952

[22] Filed: Jan. 31, 1986

[30] Foreign Application Priority Data

Mar. 8, 1985 [JP] Japan .................................. 60-45951
Mar. 8, 1985 [JP] Japan .................................. 60-45952

[51] Int. Cl.⁴ ........................ G06F 3/14; G09G 3/28; G09G 3/10
[52] U.S. Cl. .................................. 340/767; 340/784; 340/793; 340/805
[58] Field of Search ............... 340/784, 805, 793, 767; 315/169.1, 169.3, 250, 217, 224

[56] References Cited

U.S. PATENT DOCUMENTS

| | | | |
|---|---|---|---|
| 3,883,778 | 5/1975 | Kaji et al. | 340/805 |
| 3,886,403 | 5/1975 | Owaki et al. | 340/767 |
| 4,021,607 | 5/1977 | Amano | 340/767 |
| 4,087,792 | 5/1978 | Asars | 315/169.3 |
| 4,149,111 | 4/1979 | Coates, Jr. | 340/767 |
| 4,286,195 | 8/1981 | Swinea, Jr. | 315/224 |
| 4,353,062 | 10/1982 | Lorteije et al. | 340/767 |
| 4,378,556 | 3/1983 | Wisnieff | 340/793 |
| 4,385,293 | 5/1983 | Wisnieff | 340/767 |
| 4,559,535 | 12/1985 | Watkins et al. | 340/793 |
| 4,595,919 | 6/1986 | Holz et al. | 315/169.1 |
| 4,622,549 | 11/1986 | Criscimagna et al. | 340/767 |
| 4,707,638 | 11/1987 | Hara et al. | 315/169.3 |

Primary Examiner—Howard A. Birmiel
Attorney, Agent, or Firm—Cushman, Darby & Cushman

[57] ABSTRACT

A display control system can implement a gray-scale display of an image composed of a plurality of display dots on a display screen. A plurality of luminance data each representing an intensity level of a corresponding one of the plurality of display dots are first generated. Each luminance data is then converted into a pulse signal whose pulse number corresponds to an intensity level of the corresponding display dot represented by the luminance data. And, each display dot on the display screen is activated in accordance with a corresponding one of the thus produced pulse signals. To eliminate flicker of the display dots, the display dots on the display screen are grouped into a plurality of display sections each composed of a predetermined number of adjacent display dots, and if the display dots in one display section are equal in intensity level, these display dots are activated by the pulse signals which are equal in pulse-number but different in phase.

5 Claims, 9 Drawing Sheets

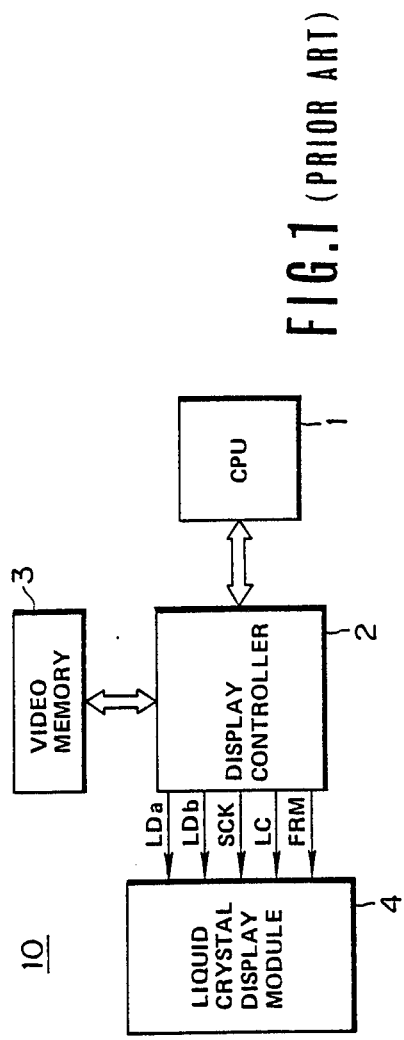
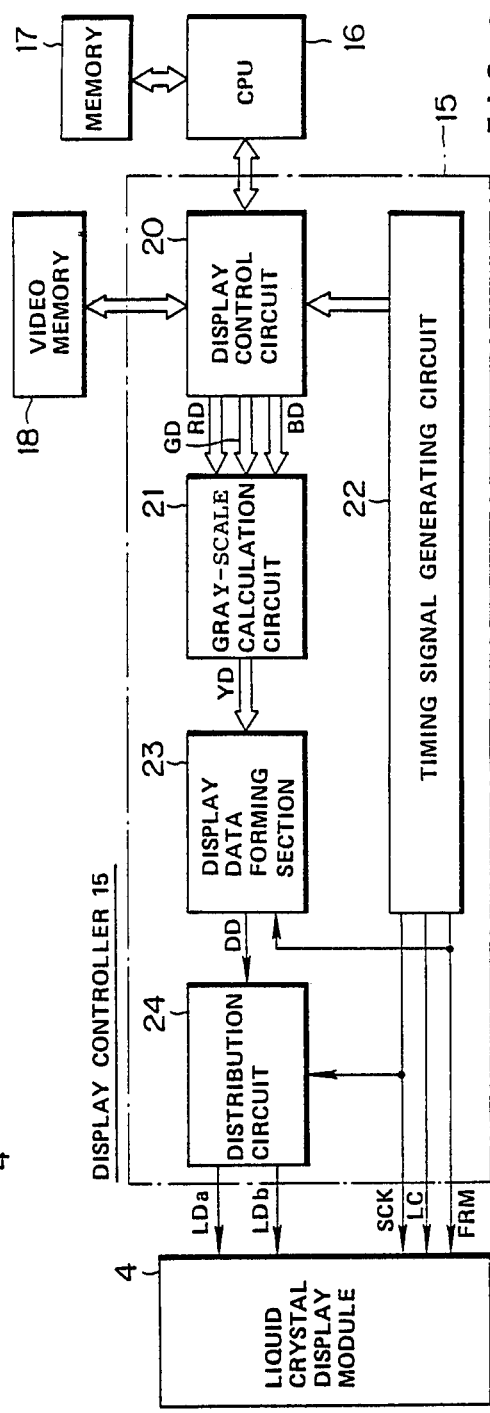

DISPLAY CONTROL SYSTEM

BACKGROUND OF THE INVENTION

1. Field of the Invention

This invention relates to a display control system for use in a display unit such as a liquid crystal display unit and a CRT display unit, and in particular to such a display control system which can implement a gray-scale display.

2. Prior Art

FIG. 1 shows one conventional liquid crystal display unit 10. The display unit 10 comprises a CPU (Central Processing Unit) 1, a display controller 2, a video memory 3 and a liquid crystal display module 4. The liquid crystal display module 4 includes, as shown in FIG. 2, a liquid crystal display panel 5 and a panel driver circuit 6 provided for driving the display panel 5. The liquid crystal display panel 5 has, for example, 640 horizontal electrodes (column electrodes) and 200 vertical electrodes (row electrodes) for displaying an image composed of a 640×200 dot matrix. The liquid crystal display panel 5 is divided into two display blocks A and B of an identical construction which are independently driven, the liquid crystal display panel 5 being commercially available. The column electrodes of the display block A are driven by a circuit comprising a 640-bit shift register 7a, a 640-bit latch circuit 8a and an electrode driving circuit 9a, while the column electrodes of the display block B are driven by another circuit comprising a 640-bit shift register 7b, a 640-bit latch circuit 8b and an electrode driving circuit 9b. The row electrodes of the display blocks A and B are driven by a circuit comprising a 100-bit shift register 11 and an electrode driving circuit 12.

With this construction, the CPU 1 (FIG. 1) stores image data into the video memory 3 and then outputs a display command to the display controller 2. In response to this display command, the display controller 2 reads the image data from the video memory 3 and forms, in accordance with the read image data, display data LDa and LDb in the form of serial data. The display controller 2 then outputs the display data LDa and LDb to the liquid crystal display module 4 together with a shift clock signal SCK. As a result, the display data LDa and LDb are sequentially stored respectively into the shift registers 7a and 7b. When the display data LDa and LDb are fully loaded onto the shift register 7a and 7b, respectively, the display controller 2 outputs a latch clock signal LC and a frame signal FRM. When the signals LC and FRM are outputted, the data contained in the shift registers 7a and 7b are loaded onto the latch circuits 8a and 8b and at the same time a "1" signal is stored into the first-bit stage of the shift register 11, whereby a display of dots is made on each of the 1st (uppermost) and 101st rows of the display panel 5. The display controller 2 then outputs the data LDa and LDb for displaying dots on the 2nd and 102nd rows of the display panel 5 together with the shift clock signal SCK, and outputs the latch clock signal LC when the data LDa and LDb (640 bits) are fully loaded onto the shift registers 7a and 7b. As a result, the data contained in the shift registers 7a and 7b are stored into the latch circuits 8a and 8b and at the same time a "1" signal is stored into the second bit-stage of the shift register 11, whereby a display of dots is made on each of the 2nd and 102nd rows of the display panel 5. And thereafter, an operation similar to the above is repeatedly carried out to display dots on the display panel 5. The aforesaid frame signal FRM is outputted at the beginning of each frame scanning. The frame frequency of this display unit 10 is set to 70 Hz.

To display an image in gray-scale with the above-described liquid crystal display unit 10, one of the following methods have conventionally been taken. According to one of the methods, the voltages applied to the display panel 5 to display the respective dots are individually controlled as disclosed in Japanese Patent Application Laid-Open No. 59-149393. With this prior art liquid crystal display apparatus, the effective voltage applied to each dot of the liquid crystal display module is changed as shown at E, F and G in FIG. 6 of the published document. In FIG. 6, the effective voltage $V_{on}$ shown at F for displaying a dot at the highest intensity level is represented by:

$$V_{on}^2 = (1/N)V_0^2 + [(N-1)/N](V_0/a)^2$$

Wherein a is equal to $(N^{1/2}+1)$. Also, the effective voltage $V_{off}$ shown at F for displaying a dot at the lowest intensity is represented by:

$$V_{off}^2 = (1/N)(1-2/a)^2 V_0^2 + [(N-1)/N](V_0/a)^2$$

And, the effective voltage $V_h$ shown at E for displaying a dot of a half tone is represented by:

$$V_h^2 = V_0^2/2N + (\tfrac{1}{2}N)(1-2/a)^2 V_0^2 + [(N-1)/N]V_0/a)^2$$

According to another conventional method, the pulse widths of the voltages applied to the display panel 5 to display the respective dots are individually controlled.

In either of the above two cases, a circuit for performing such a control must have been additionally provided within the liquid crystal display module 4, which has significantly increased the costs thereof since such a control circuit is very complicated.

SUMMARY OF THE INVENTION

It is therefore an object of the present invention to provide a display control system for a dot matrix display unit which can display an image in gray-scale and can be manufactured at lower costs.

Another object of the invention is to provide a display control system which can display an image in gray-scale with the conventional non-gray-scale type liquid crystal display module.

A further object of the invention is to provide a display control system for a liquid crystal display module which can display an image in gray-scale and is simple in construction.

A further object of the invention is to provide a display control system which can implement a gray-scale display of an image with less flicker.

According to an aspect of the present invention, there is provided a display control system for displaying an image composed of a plurality of display dots provided on a display screen comprising luminance data generating means for generating a plurality of luminance data each representing an intensity level of a respective one of the plurality of display dots provided on the display screen; conversion means for converting each luminance data fed from the luminance data generating means into a pulse signal whose pulse number corresponds to the intensity level represented by the each luminance data; and activation means for activating each of the plurality of display dots on the display screen in accordance with a respective one of the pulse signals fed from the conversion means.

BRIEF DESCRIPTION OF THE DRAWINGS

FIG. 1 is a block diagram of a conventional liquid crystal display unit;

FIG. 3 is a block diagram of a display control system provided in accordance with a first embodiment of the invention;

FIG. 14 is a timing chart for explaining the operation of the display control system of FIG. 8 during the time when the dots on the first row of the display panel are displayed;

FIG. 15 is a timing chart for explaining the operation of the display control system of FIG. 8 during the time when the dots on the second row of the display panel are displayed.

DESCRIPTION OF THE PREFERRED EMBODIMENTS OF THE INVENTION

A first embodiment of the present invention will now be described with reference to FIGS. 3 to 7.

Figure 2:
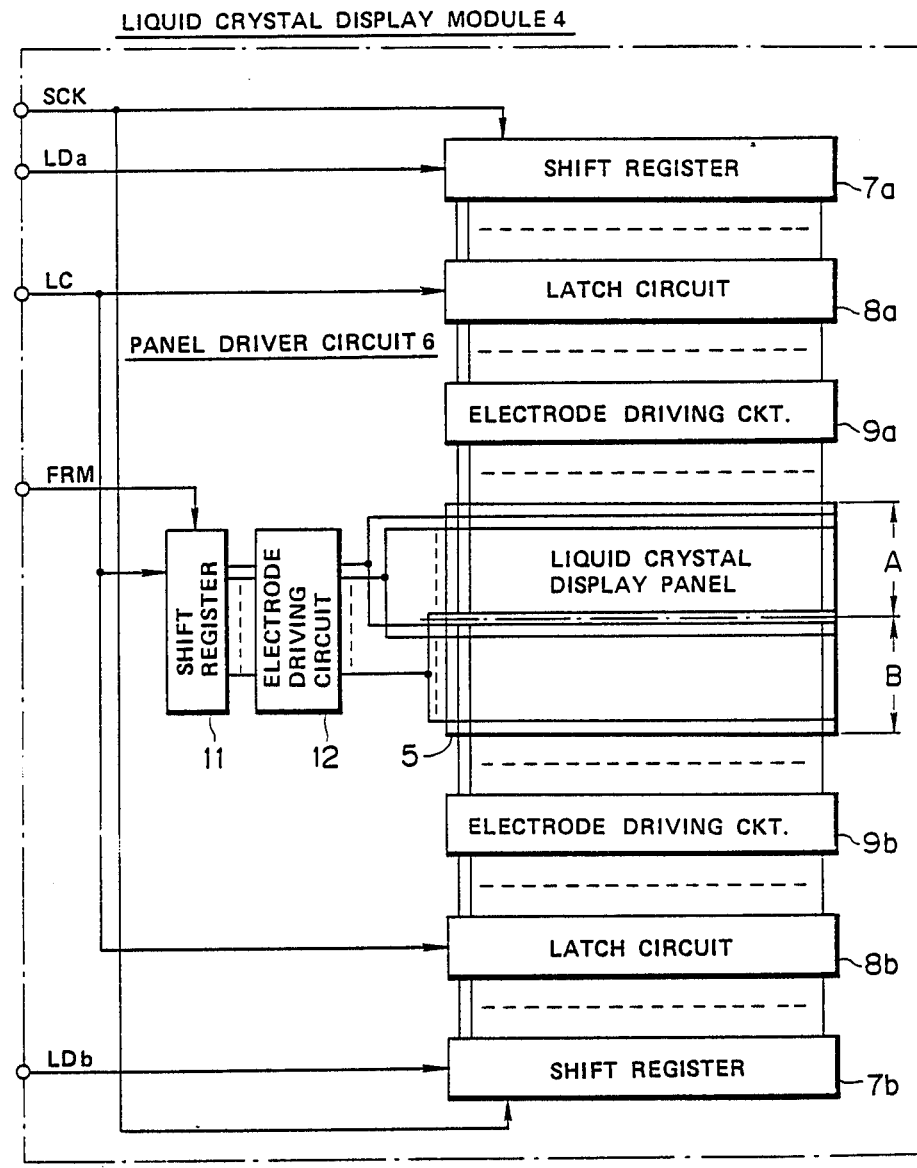
FIG. 2 is a block diagram of the liquid crystal display module 4 of the liquid crystal display unit of FIG. 1.
Figure 4:
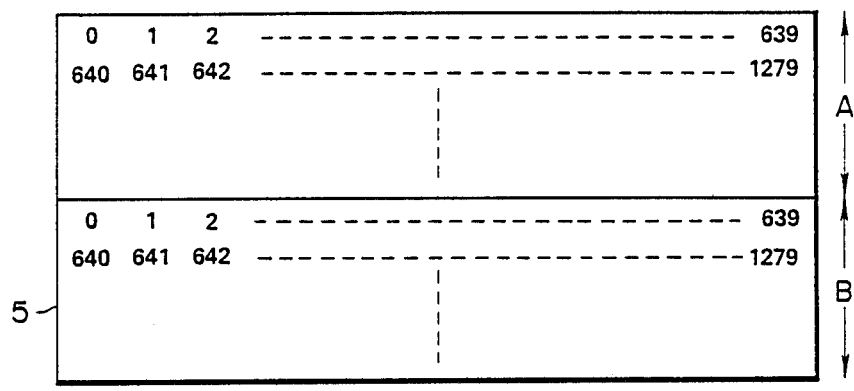
FIG. 4 is an illustration showing dots on the display panel 5 of the liquid crystal display module 4 shown in FIG. 3.

In FIG. 3, there is shown a liquid crystal display unit to which a display control system provided in accordance with the present invention is applied. A display controller 15 is connected to a liquid crytal display module 4, a CPU 16 and a video memory 18 which comprises a RAM, the liquid crystal display module 4 being of the same construction as that shown in FIG. 2. The CPU 16 is connected to a memory 17 which comprises a ROM for storing programs to be executed by the CPU 16 and a RAM for storing data. The video memory 18 is supplied from the CPU 16 with color codes each of which is composed of four bits and corresponds to a respective one of the dots of the display panel 5 in the liquid crystal display module 4. The display controller 15 is so constructed that it can drive either of a liquid crystal display module and a CRT display unit, and in the case where a CRT display unit is connected thereto in place of the liquid crystal display module 4, a color image can be displayed on the CRT screen in accordance with the color codes in the video memory 18. On the other hand, in the case where the liquid crystal display module 4 is connected to the display control system 15, an image composed of a dot matrix can be displayed in gray-scale wherein the intensity or density of each dot of the display image corresponds to a color represented by a respective one of the color codes. For simplicity, only those of the circuits necessary for driving the liquid crystal display module 4 are shown in FIG. 3.

The display controller 15 comprises a display control circuit 20 which sequentially reads the color codes from the video memory 18 and converts each of the read color codes into three color data RD (red), GD (green) and BD (blue) each composed of three bits. Assuming that the dots on the display panel 5 are assigned the numbers shown in FIG. 4, the display control circuit 20 first reads the color codes corresponding to the dots No. 0 to No. 7 on the display block A and sequentially converts each of them into the color data RD, GD and BD. The display control circuit 20 subsequently reads the color codes corresponding to the dots No. 0 to No. 7 on the display block B and sequentially converts each of them into the color data RD, GD and BD, and the control circuit 20 then reads the color codes corresponding to the dots No. 8 to No. 15 on the display block A and converts each of them into the color data RD, GD and BD. And thereafter, the display control circuit 20 repeatedly carry out an operation similar to the above. For better understanding, the relationship between the color codes and the three color data RD, GD and BD is shown in Table 1.

TABLE 1

| color code | color | RD | | | GD | | | BD | | |
|---|---|---|---|---|---|---|---|---|---|---|
| | | $R_2$ | $R_1$ | $R_0$ | $G_2$ | $G_1$ | $G_0$ | $B_2$ | $B_1$ | $B_0$ |
| 0000 | Black | 0 | 0 | 0 | 0 | 0 | 0 | 0 | 0 | 0 |
| 0001 | Blue | 0 | 0 | 0 | 0 | 0 | 0 | 1 | 0 | 0 |
| 0010 | Green | 0 | 0 | 0 | 1 | 0 | 0 | 0 | 0 | 0 |
| 0011 | Cyan | 0 | 0 | 0 | 1 | 0 | 0 | 1 | 0 | 0 |
| 0100 | Red | 0 | 1 | 1 | 0 | 0 | 0 | 0 | 0 | 0 |
| 0101 | Magenta | 1 | 0 | 0 | 0 | 0 | 0 | 1 | 0 | 0 |
| 0110 | Brown | 1 | 0 | 0 | 0 | 1 | 1 | 0 | 0 | 0 |
| 0111 | White | 1 | 0 | 0 | 1 | 0 | 0 | 1 | 0 | 0 |
| 1000 | Gray | 0 | 0 | 1 | 0 | 0 | 1 | 0 | 0 | 1 |
| 1001 | Light Blue | 0 | 0 | 0 | 0 | 0 | 0 | 1 | 1 | 0 |
| 1010 | Light Green | 0 | 0 | 0 | 1 | 1 | 0 | 0 | 0 | 0 |
| 1011 | Light Cyan | 0 | 0 | 0 | 1 | 1 | 0 | 1 | 1 | 0 |
| 1100 | Light Red | 1 | 0 | 1 | 0 | 0 | 0 | 0 | 0 | 0 |
| 1101 | Light Magenta | 1 | 1 | 0 | 0 | 0 | 0 | 1 | 1 | 0 |
| 1110 | Yellow | 1 | 1 | 0 | 1 | 1 | 0 | 0 | 0 | 0 |
| 1111 | White (High Intensity) | 1 | 1 | 1 | 1 | 1 | 1 | 1 | 1 | 1 |

A gray-scale calculation circuit 21 produces a gray-scale or an intensity data YD by effecting the following arithmetic operation on the color data RD, GD and BD sequentially supplied from the display control circuit 20:

```
            R₂  R₁  R₀
                    R₂
                B₂  B₁
  +)  G₂  G₁  G₀  G₂
  ─────────────────────
      Y₄  Y₃  Y₂  Y₁  Y₀
```

Wherein $R_0$, $R_1$ and $R_2$ are the first, second and third bits of the color data RD, respectively, and this is true with $G_0$ to $G_2$ and $B_0$ to $B_2$. Only the second to fourth bits $Y_1$ to $Y_3$ of the calculation result are outputted as the gray-scale data YD. The reason why the upper three bits $Y_2$ to $Y_4$ are not used as the gray-scale data YD is that an eight-level gray-scale representation can not be achieved with those three bits since the maximum value represented by those bits is not eight but six. An eight-level gray-scale can be represented by the first to third bits $Y_1$ to $Y_3$ when the relation ship between the color codes and the color data RD, GD and BD shown in Table 1 is suitably modified. The aforesaid arithmetic operation bases on the following well-known equation for converting an analog RGB signal into a luminance signal:

$$Y = 0.3R + 0.59G + 0.11B$$

A timing signal generating circuit 22 generates the shift clock signal SCK, latch clock signal LC and frame signal FRM, which have been described before with reference to FIGS. 1 and 2. The timing signal generating circuit 22 also generates various signals necessary to read the color codes from the video memory 18.

A display data forming section 23, which constitutes the main portion of the present invention, produces serial display data DD in accordance with the gray-scale data YD. The display data forming section 23 supplies the produced display data DD to the liquid crystal module 4 via a distribution circuit 24, whereby dots are displayed on the liquid crystal panel 5 at intensity (or density) levels determined respectively by the gray-scale data YD, as will be more fully described later.

Figure 5:
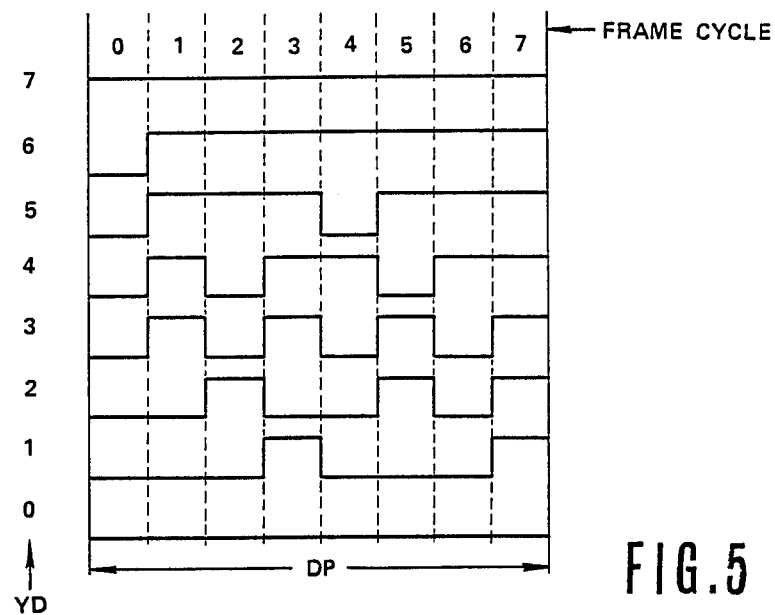
FIG. 5 is a timing chart showing display timings of a dot at different intensity levels.

The basic principle of the gray-scale display in this embodiment will now be described. In this embodiment, display of an image is performed on a frame basis, and eight consecutive frames constitute one display period. When the gray-scale data YD for a given dot (dot X) on the panel 5 is "7" (black), the dot X is displayed in each of the eight frame cycles within a display period, that is to say, eight times within one display period. When the gray-scale data YD of the dot X is "0" (white), the dot X is not displayed in any one of the eight frame cycles within a display period. On the other hand, when the gray-scale data YD of the dot X is any one of "1" to "6", the dot X is displayed the number of times determined by the gray-scale data YD. For example, when the gray-scale data YD is "6", the dot X is displayed seven times within one display period, and when the gray-scale data YD is "5", the dot is displayed six times. Thus, in this embodiment, the gray-scale display is achieved based on the number of times of display of each dot. The wording "display a dot" actually means that the dot on the panel 5 is activated by a voltage, that is to say, data representative of "1" for activating the dot is loaded onto the shift register 7a or 7b shown in FIG. 2. FIG. 5 shows one example of the relation between each gray-scale data YD and a display timing of the corresponding dot. It will be appreciated from FIG. 5 that when the gray-scale data for a dot to be displayed is "7", the dot is displayed in the first through eighth frame cycles within each display period. And when the gray-scale data YD is "4", the dot is displayed in the second, fourth, fifth, seventh and eighth frame cycles within each display period.

Figure 6:
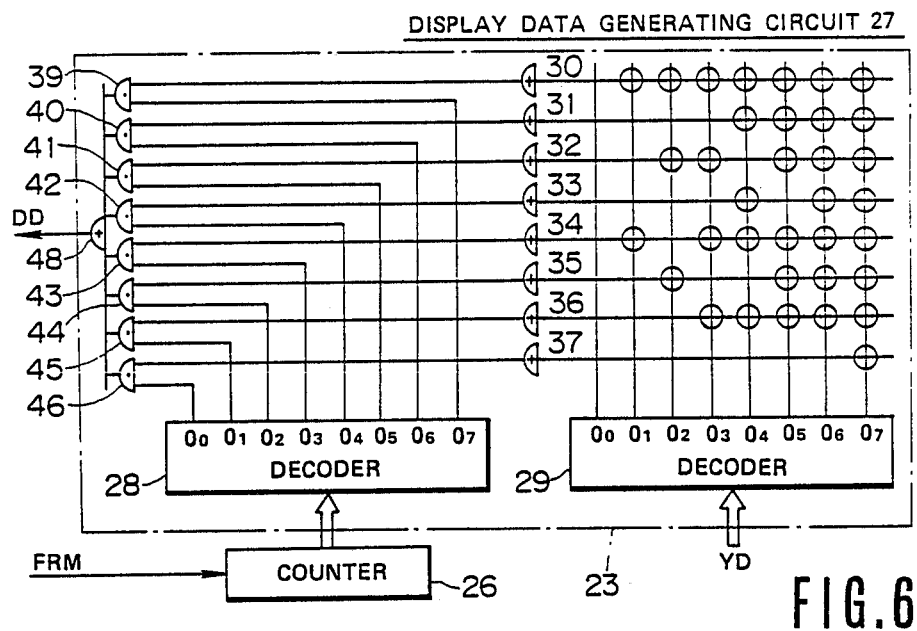
FIG. 6 is a circuit diagram of the display data generating circuit 27 of the display control system of FIG. 3.

The construction of the display data forming section 23 will now be described. As shown in FIG. 6, the display data forming section 23 comprises a counter 26 and a display data generating circuit 27, and produces the data DD based on the display timings shown in FIG. 5. The counter 26 is of a three-bit type and counts up the frame signal FRM. The frame signal FRM is outputted once at the beginning of each frame scanning, as described before, and therefore one count-cycle of this counter 26 is equal in time length to the display period DP shown in FIG. 5, and the output of the counter 26 indicates the number of a current frame cycle. The display data generating circuit 27 comprises a decoder 28 for decoding the output of the counter 26, a decoder 29 for decoding the gray-scale data YD, and OR gates 30 to 37. Each of the OR gates 30 to 37 effects a logical OR operation on signals applied to nodes (circles) of the input line thereof. For example, the OR gate 32 effects a logical OR operation on those signals fed from the output terminals $O_2$, $O_3$, $O_5$, $O_6$ and $O_7$ of the decoder 29, and the OR gate 35 effects a logical OR operation on the signals outputted from the output terminals $O_2$, $O_5$, $O_6$ and $O_7$ of the decoder 29. AND gates 39 to 46 effect logical AND operations respectively on signals from the OR gate 30 and the output terminal $O_7$ of the decoder 28, signals from the OR gate 31 and the output terminal $O_6$ of the decoder 28, . . . and signals from the OR gate 37 and the output terminal $O_0$ of the decoder 28. And, an OR gate 48 effects a logical OR operation on signals outputted from the AND gates 39 to 46 to form the display data DD at its output terminal.

With the above construction, when the counter 26 outputs data representative of "0", the AND gate 46 is enabled to open, so that the output signal of the OR gate 37 is outputted through the AND gate 46 and the OR gate 48 as the display data DD. In this case, the output signal of the OR gate 37 becomes "1" only when the signal at the output terminal $O_7$ of the decoder 29 is "1", that is to say, only when the gray-scale data YD is "7". More specifically, when the counter 26 output data representative of "0", the display data DD becomes "1" only when the gray-scale data YD is "7", and becomes "0" when the gray-scale data YD is any one of "0" to "6" (see FIG. 5). Similarly, in the case of the output of the counter 26 being "1", the display data DD becomes "1" when the gray-scale data YD is any one of "3" to "7", in the case of the output of the counter 26 being "2", the display data DD becomes "1" when the gray-scale data YD is "2", "5", "6" or "7", and so on. Thus, the display data forming section 23 produces the display data DD which is rendered "1" in accordance with the gray-scale data YD and the timing shown in FIG. 5. The thus produced display data DD is fed to the liquid crystal panel 5 to drive it, whereby the dots on the display panel 5 are displayed at the respective intensity levels determined by the waveform shown in FIG. 5.

Figure 7:
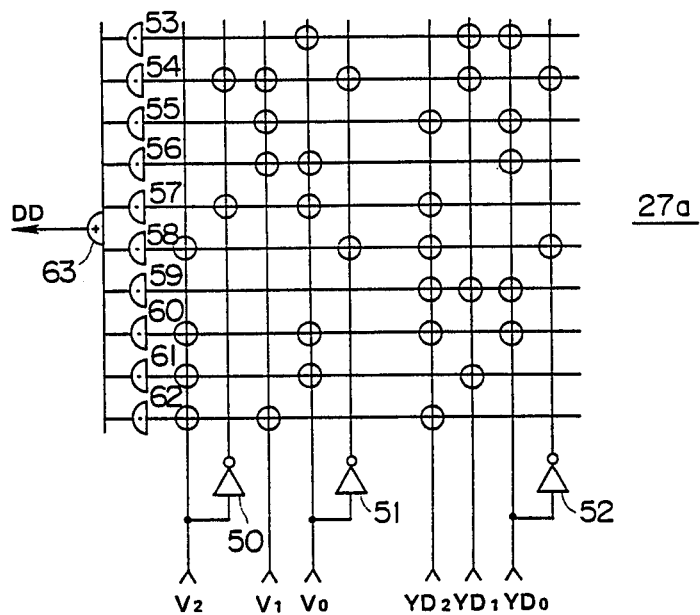
FIG. 7 is a circuit diagram of a modified form of the display data generating circuit 27 of FIG. 6.

FIG. 7 shows a modified form of the display data generating circuit 27 shown in FIG. 6. In FIG. 7, $V_0$ to $V_2$ are output signals of the first to third (MSB) bit-stages of the counter 26, and $YD_0$ to $YD_2$ are the first to third (MSB) bits of the gray-scale data YD. Shown at 50 to 52 are inverters, 53 to 62 AND gates, and 63 an OR gate. This modified display data generating circuit 27a can implement the same function as the display generating circuit 27 shown in FIG. 6 with a simplified construction.

Referring again to FIG. 3, a distribution circuit 24 latches the serial display data DD on a sixteen bit basis, and serially outputs the half (eight bits) of the latched data to be displayed on the display block A as data LDa and the other half (eight bits) of the latched data to be displayed on the display block B as data LDb in synchronization with the shift clock pulse SCK. The data LDa and LDb thus serially outputted are shifted respectively into the shift registers 7a and 7b and displayed on the display panel 5.

In the embodiment described above, the color codes are stored in the video memory 18, however the gray-scale data YD may alternatively be stored in advance in the video memory 18. Also, although the above-described display control system 15 is so arranged as to be used with a liquid crystal display module, it will be apparent that this invention can also be applied to a CRT display unit.

As described above, with the above display control system, a gray-scale display can be implemented without the need for an expensive liquid crystal display module which includes therein a circuit for implementing a gray-scale display. In addition, the main portion of the display control system according to the present invention is simple in construction, as shown in FIG. 7.

A second embodiment of the present invention will now be described.

This second embodiment is so designed as to eliminate the flicker of half-tone dots which may occur in the aforesaid first embodiment. Such flicker is particularly conspicuous when an image of a relatively large area is displayed with dots of the same intensity level.

Figure 8:
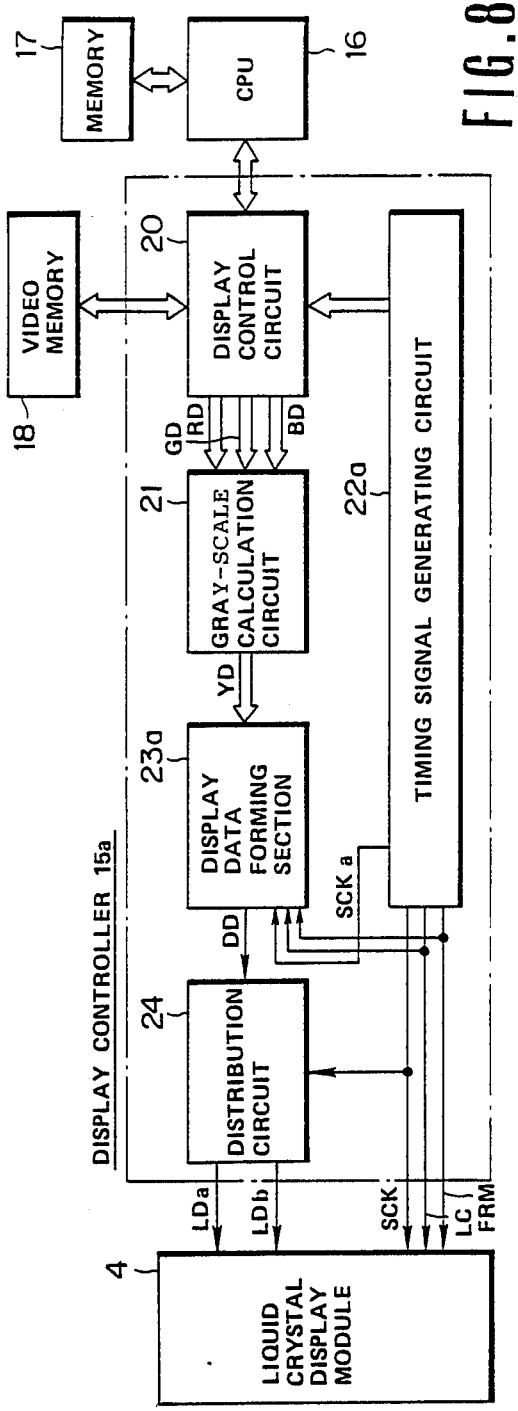
FIG. 8 is a block diagram of a display control system provided in accordance with the second embodiment of the invention.

FIG. 8 shows the structure of the second embodiment applied to a liquid crystal display unit. A display controller 15a shown in FIG. 8 is similar to the display controller 15 shown in FIG. 3 but comprises an improved display data forming section 23a.

In this second embodiment, the flicker of dots is eliminated in the following manner.

Figure 9:
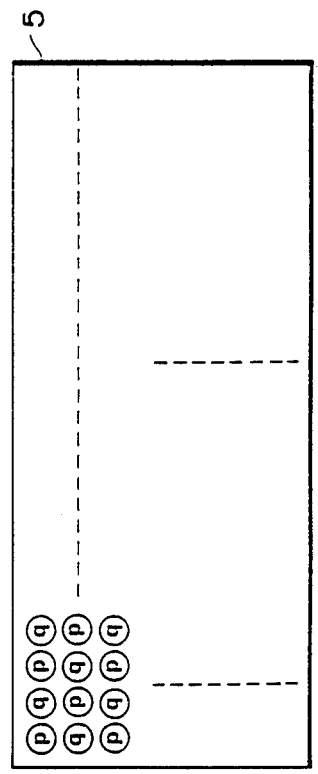
FIG. 9 is an illustration showing dots of the display panel 5 of the liquid crystal display module 4 shown in FIG. 8.
Figure 10:
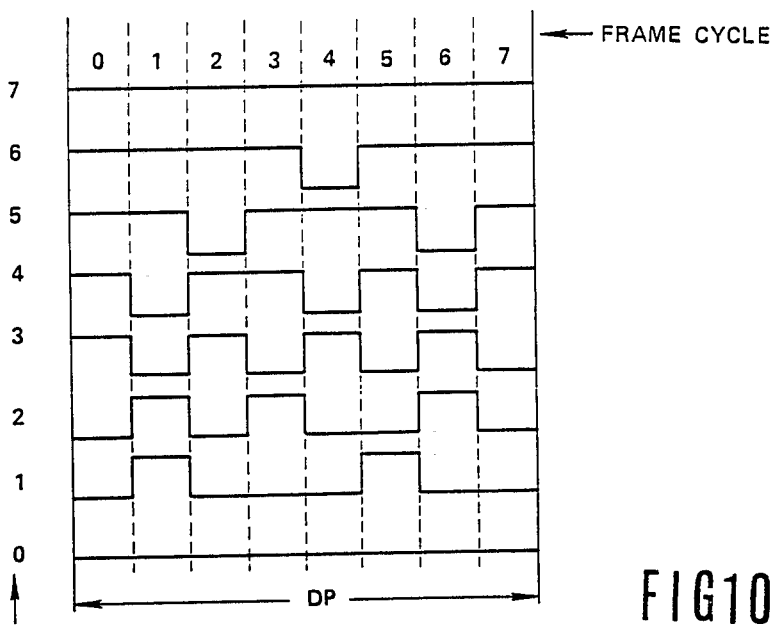
FIG. 10 is a timing chart showing display timings of the dots q shown in FIG. 9.

The dots of each of the display blocks A and B are divided into two groups as shown in FIG. 9, wherein the dots assigned p and arranged in the staggered manner constitute one group and the dots assigned q and arranged in the staggered manner constitute the other group. And, the dots p are activated in accordance with the waveforms shown in FIG. 5, while the dots q are activated in accordance with waveforms shown in FIG. 10. It will be appreciated from FIGS. 5 and 10 that dots p and q represented by gray-scale data YD of the same value are displayed the same number of times but at different timings. More specifically, the waveforms shown in FIG. 10 are 180° out of phase with respect to those shown in FIG. 5. As a result, when two adjacent dots p and q are activated by gray-scale data YD of the same value, those dots are rendered "ON" or "OFF" in different frame cycles, whereby the flicker is eliminated. With the first embodiment however, two adjacent dots activated by gray-scale data of the same value are rendered "ON" or "OFF" in the same frame cycle, so that the flicker is conspicuous.

The construction of the display data forming section 23a will now be described.

Figure 11:
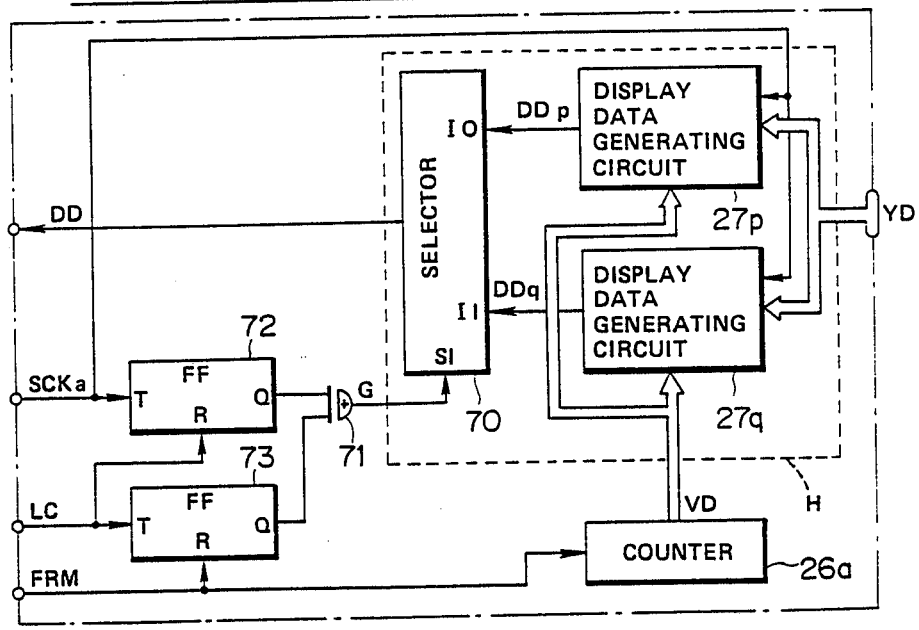
FIG. 11 is a block diagram of the display data forming section 23a of the display control system of FIG. 8.
Figure 12:
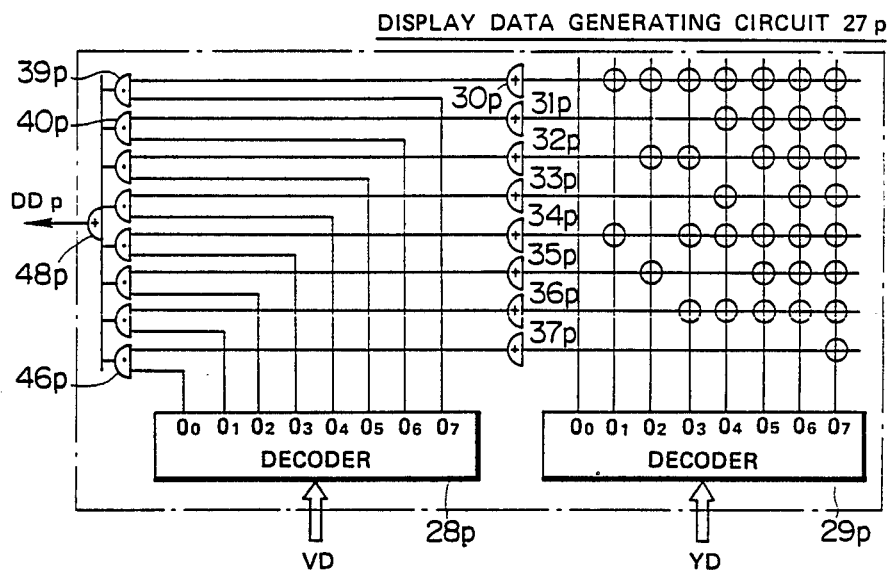
FIG. 12 is a circuit diagram of the display data generating circuit 27p of the display data forming section 23a of FIG. 11.

FIG. 11 shows the construction of the display data generating section 23a. The display data generating section 23a comprises a three-bit counter 26a for up-counting the frame signal FRM which is output at the beginning of each frame scanning. The counter 26a outputs data VD representative of the number of the current frame cycle and supplies the data to display data generating circuits 27p and 27q. The display data generating circuit 27p produces display data DDp for displaying the dots p in accordance with the gray-scale data YD supplied thereto and the display timing shown in FIG. 5. The display data generating circuit 27q produces serial display data DDq for displaying the dots q in accordance with the gray-scale data YD and the display timing shown in FIG. 10. The display data generating circuit 27p comprises, as shown in FIG. 12, a decoder 28p for decoding the output data VD of the counter 26a, a decoder 29p for decoding the gray-scale data YD, OR gates 30p to 37p, AND gates 39p to 46p and an OR gate 48p. This display data generating circuit 27p is identical in construction to the display data generating circuit 27 shown in FIG. 6, and outputs from the AND gate 48p the display data DDp.

With this display data generating circuit 27p, the display data DDp is rendered "1" in accordance with the gray-scale data YD and the display timing shown in FIG. 5.

Figure 13:
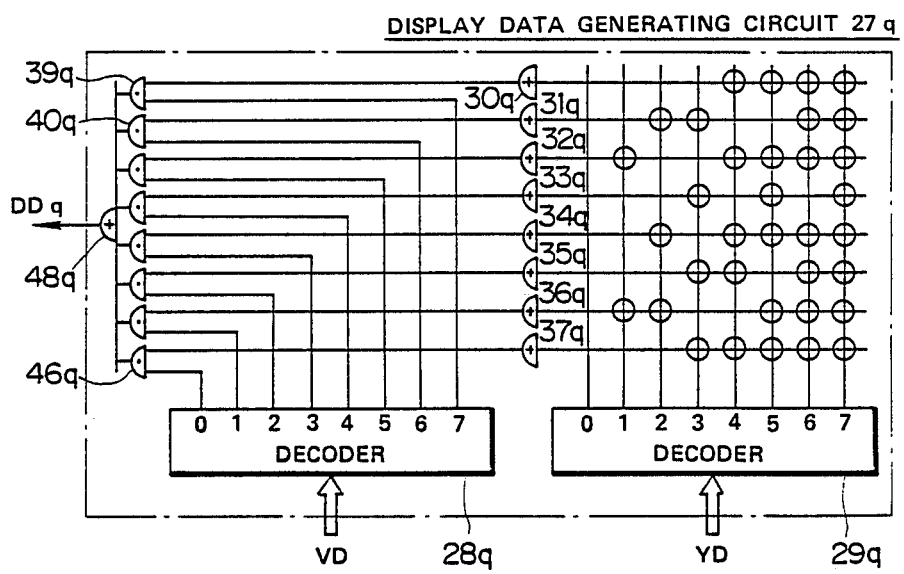
FIG. 13 is a circuit diagram of the display data generating circuit 27q of the display data forming section 23a of FIG. 11.

FIG. 13 shows the construction of the display data generating circuit 27q which differs from the display data generating circuit 27p of FIG. 12 in the way of application of the output signals of the decoder 29q to the OR gates 30q to 37q. For example, input terminals of the OR gate 30q are connected to the decoder 29q so that the OR gate 30q effects a logical OR operation on the signals outputted from the output terminals $O_4$ to $O_7$ of the decoder 29q, and input terminals of the OR gate 31q are connected to the decoder 29q so that the OR gate 31q effects a logical OR operation on the signals outputted from the output terminals $O_2$, $O_3$, $O_6$ and $O_7$ of the decoder 29q.

This display data generating circuit 27q produces serial display data DDq which is rendered "1" in accordance with the gray-scale data YD and the display timing shown in FIG. 10.

Referring again to FIG. 11, the display data DDp and DDq outputted from the display data generating circuits 27p and 27q are supplied respectively to input terminals $I_0$ and $I_1$ of a selector 70. The selector 70 outputs the display data DDp when a "0" signal is applied to a selection terminal $S_1$ thereof, and outputs the display data DDq when a "1" signal is applied to the selection terminal $S_1$. The data outputted from the selector 70 is supplied to the distribution circuit 24 shown in FIG. 8 as display data DD. The display data forming section 23a further comprises and exclusive OR gate 71 and flip-flops 72 ad 73 which will be more fully described later.

Figures 14, 15:
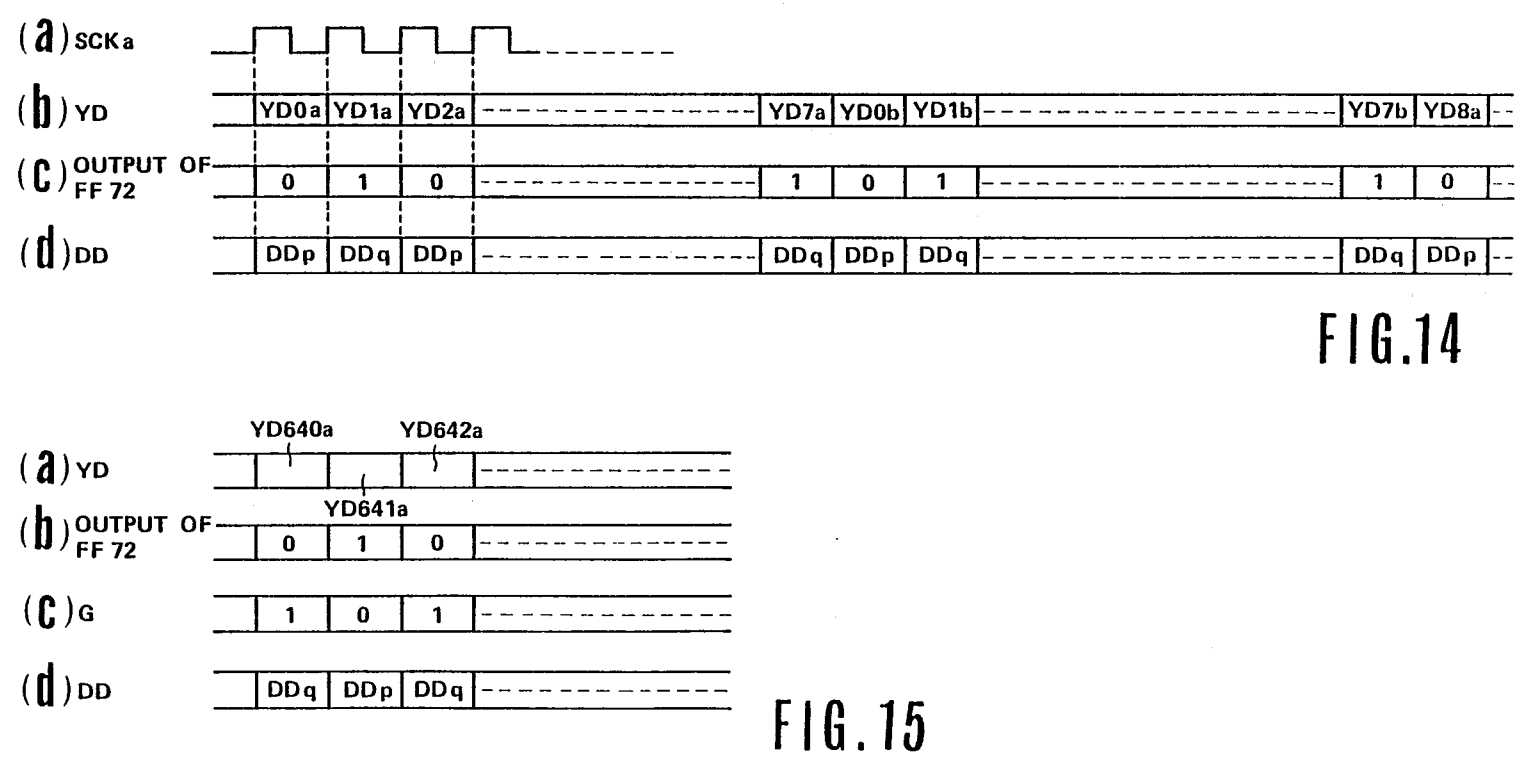

The operation of the display data forming section 23a will now be described with reference to timing charts shown in FIGS. 14 and 15. Shown at (a) in FIG. 14 is a clock signal SCKa generated by the timing signal generating circuit 22a, and each gray-scale data YD shown at (b) is supplied to the display data generating circuits 27p and 27q in synchronization with this clock signal SCKa. As a result, the display data DDp and DDq, which correspond to the gray-scale data YD, are outputted respectively from the display data generating circuit 27p and 27q in synchronization with the clock signal SCKa. The gray-scale data YD shown at (b) in FIG. 14 includes data $YD_{0a}$ for displaying the dot No. 0 of the display block A, data $YD_{1a}$ for displaying the dot No. 1 of the display block A, . . . and also includes data $YD_{0b}$ for displaying the dot No. 0 of the display block B, data $YD_{1b}$ for displaying the dot No. 1 of the display block B, . . . On the other hand, the flip-flop 72 is set by the clock signal SCKa and reset by the latch clock signal LC. And therefore, the flip-flop 72 outputs the signal shown at (c) in FIG. 14, which signal is rendered "1" or "0" in synchronization with the clock signal SCKa. The flip-flop 73 is set by the latch clock signal LC and reset by the frame signal FRM. During the time when the flip-flop 73 outputs a "0" signal from an output terminal Q thereof, the exclusive OR gate 71 operates as a mere buffer amplifier, so that a signal outputted from an output terminal Q of the flip-flop 72 passes through the exclusive OR gate 71 and is supplied to the selection terminal of the selector 70 as a change-over signal G. As a result, the selector 70 outputs the display data DDp and DDq alternatively as the display data DD, as shown at (d) in FIG. 14. When the display data DD for all of the dots (1280 dots) on the 1st and 101st rows of the display panel 5 have been outputted from the selector 70, the latch clock signal LC is fed from the timing signal generating circuit 22a (FIG. 8). As a result, the flip-flop 72 is reset, while the flip-flop 73 is brought into a set state to output a "1" signal from the output terminal Q thereof. Consequently, the exclusive OR gate 71 operates as an inverter, so that the output signal of the flip-flop 72 is inverted by the exclusive OR gate 71 and thence supplied to the selector 70. Thus, during the time when the gray-scale data YD for the dots on the 2nd and 102nd rows of the display panel 5 are sequentially fed to this display data forming section 23a, the output signal of the flip-flop 72 varies as shown at (b) in FIG. 15. As a result, the change-over signal G varies as shown at (c) in FIG. 15, so that the selector 70 alternately outputs the display data DDq and DDp as the display data DD as shown at (d) in FIG. 15. Thus, when the dots on the 1st and 101st rows of the display panel 5 are displayed, the display data DDp and DDq are sequentially outputted as the display data DD in the order of DDp, DDq, DDp, DDq, . . . and when the dots on the 2nd and 102nd rows are displayed, the display data DDp and DDq are sequentially outputted as the display data DD in the order of DDq, DDp, DDq, DDp, . . . And, an operation similar to the above is repeatedly carried out. The display data DD thus produced are sequentially supplied through the distribution circuit 24 to the liquid crystal display panel 5, whereby the gray-scale display of each dot is performed in accordance with a corresponding one of the display patterns of FIGS. 5 and 10 which are assigned respectively to the staggered dots p and q.

Figure 16:
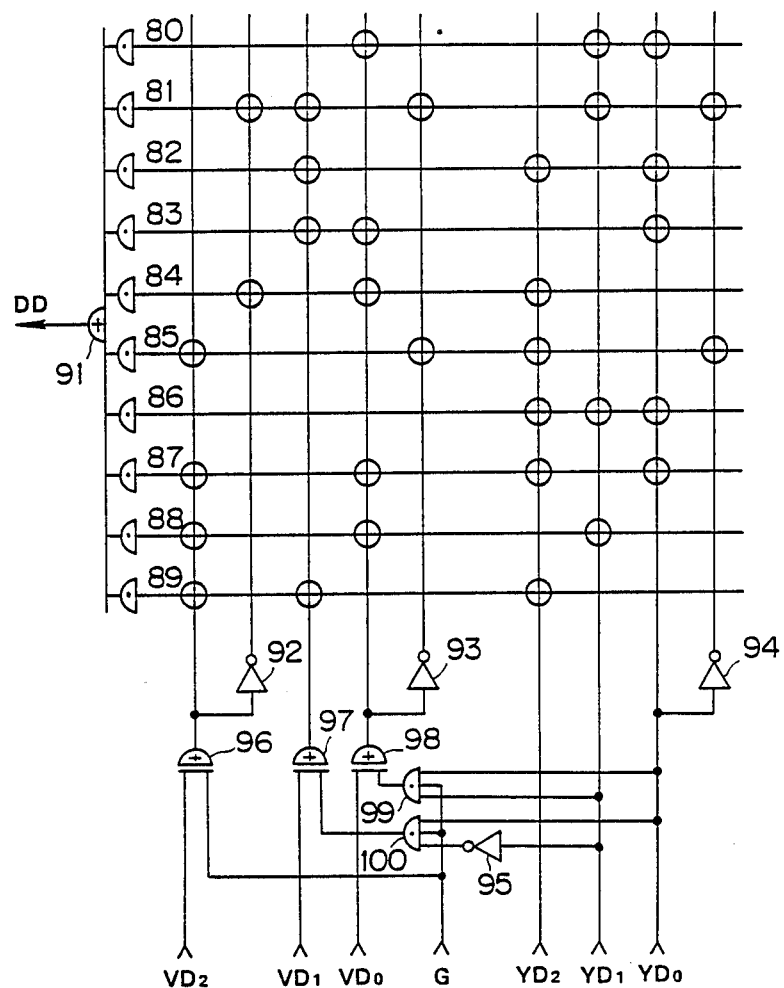
FIG. 16 is a circuit diagram of a modified form of the circuit portion H of the display data forming section 23a of FIG. 11.

FIG. 16 shows a modified form of the circuit portion H of the display data forming section 23a encircled by a broken line in FIG. 11. This circuit comprises AND gates 80 to 89, an OR gate 91 for logically adding outputs of the AND gates 80 to 89 together, inverters 92 to 95, exclusive OR gates 96 to 98, and AND gates 99 and 100.

This circuit can implement the same function as the circuit portion H of the display data forming section 23a of FIG. 11 with a simpler construction.

What is claimed is:

1. A display control system for displaying an image composed of a plurality of display dots provided on a display screen, the plurality of display dots on the display screen being grouped into a plurality of display sections, each of which has an equal number of display dots and each of said display sections including at least two adjacent display dots, comprising:
   (a) luminance data generating means for generating a plurality of luminance data, each representing an intensity level of a respective one of the plurality of display dots on the display screen;
   (b) conversion means, coupled to said luminance data generating means for converting each said luminance data from said luminance data generating means into a pulse signal whose pulse number corresponds to an intensity level represented by said each luminance data such that those of said pulse signals for activating display dots in a same display section are indentical in pulse number but substantially different in phase from one another when luminance data representative of intensity levels of said display dots in the same display section are identical to one another; and
   (c) activation means for activating each of the plurality of display dots on the display screen in accordance with a respective one of the pulse signals fed from said conversion means.

2. A display control system according to claim 1, wherein those of said pulse signals for activating those of the display dots which are included respectively in different display sections but disposed at corresponding positions in said different display sections are identical in number and phase to one another if luminance data representative of intensity levels of said those of the display dots are the same.

3. A display control according to claim 1, wherein said conversion means comprises conversion circuits equal in number to the display dots of each display section, each of said conversion circuits corresponding to a respective one of the display dots of each of said display sections, and converting those of said luminance data representing intensity levels of the respective ones of the display dots of said display sections into the pulse signals.

4. A display control system according to claim 1, wherein said luminance data generating means comprises memory means for storing color data each representative of a color of a respective one of the display dots on the display screen, and data conversion means for converting said color data into said luminance data.

5. A display control system according to claim 1, wherein the image composed of the plurality of display dots is displayed on the display screen in a scanning manner, and wherein said conversion means converting each luminance data into the corresponding pulse signal using a predetermined number of frame cycles of the scanning of the display screen, said conversion means determining in each frame cycle in accordance with said each luminance data whether a pulse is to be outputted as said pulse signal, said activation means sequentially activating the display dots on the display screen in accordance with said pulse signals fed from said conversion means.

* * * * *